United States Patent
Kipka et al.

[11] Patent Number: 6,149,214
[45] Date of Patent: Nov. 21, 2000

[54] IMPLEMENT FOR DISPOSING OF DUNG OF A PET ANIMAL

[76] Inventors: John A. Kipka; Wendy J. Kipka, both of 1055 Bloor Street East #1704, Mississauga, Ontario, Canada, L4Y 2N5

[21] Appl. No.: 09/397,262

[22] Filed: Sep. 16, 1999

[51] Int. Cl.⁷ .............. A01K 29/00; E01H 1/12
[52] U.S. Cl. .............. 294/1.5
[58] Field of Search .............. 294/1.1, 1.3–1.5, 294/19.1, 19.2, 25, 55, 57, 58; 15/257.1, 257.3, 257.4, 257.7; 119/161, 867; 248/99, 101

[56] References Cited

U.S. PATENT DOCUMENTS

| | | |
|---|---|---|
| D. 355,280 | 2/1995 | Yoshioka . |
| 1,664,658 | 4/1928 | Blazer ............... 248/101 |
| 2,421,740 | 6/1947 | Birch ............... 248/101 |
| 2,462,973 | 3/1949 | Kelrick ............... 294/1.1 X |
| 3,677,596 | 7/1972 | Yonaites et al. ............... 294/1.4 |
| 3,872,831 | 3/1975 | Cassidy ............... 294/1.5 |
| 4,021,994 | 5/1977 | Mainprice ............... 294/1.4 |
| 4,262,948 | 4/1981 | Emme ............... 294/1.5 |
| 4,466,647 | 8/1984 | Spevak . |
| 4,717,186 | 1/1988 | Yoshioka . |
| 4,878,703 | 11/1989 | Yoshioka . |
| 5,344,200 | 9/1994 | Yoshioka . |
| 5,676,411 | 10/1997 | Kwok . |

FOREIGN PATENT DOCUMENTS 3938482   5/1991   Germany ............... 294/1.5

*Primary Examiner*—Johnny D. Cherry

[57] ABSTRACT

A implement for disposing of dung of a pet animal for catching feces before it falls to the ground. The implement for disposing of dung of a pet animal includes an elongate cylindrical member, a ring for supporting a disposal container wherein the ring has a coupler adapted to couple the ring to the elongate cylindrical member. The connection of the ring to the cylindrical member defines an obtuse angle between a plane of the ring and a longitudinal axis of the cylindrical member. A generally annular member, for holding the disposal container to the support, has an open side defined by two ends that each extends outward away from the annular member. The annular member is adapted to fit over the first ring wherein each of the two ends is adapted to fit on each side of the coupler. A pin is used for securing the annular member to the coupler. The pin fits in a bore in each of the ends of the annular member and a bore of the coupler. A bag is used for catching and carrying feces.

8 Claims, 1 Drawing Sheet

IMPLEMENT FOR DISPOSING OF DUNG OF A PET ANIMAL

BACKGROUND OF THE INVENTION

1. Field of the Invention

The present invention relates to feces disposal devices and more particularly pertains to a new implement for disposing of dung of a pet animal for catching feces before it falls to the ground.

2. Description of the Prior Art

The use of feces disposal devices is known in the prior art. More specifically, feces disposal devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,878,703; U.S. Pat. No. 4,466,647; U.S. Pat. No. 4,717,186; U.S. Pat. Des. No. 355,280; U.S. Pat. No. 5,676,411; and U.S. Pat. No. 5,344,200.

While these devices fulfill their respective, particular objectives and requirements, the aforementioned patents do not disclose a new implement for disposing of dung of a pet animal. The inventive device includes an elongate cylindrical member, a ring for supporting a disposal container wherein the ring has a coupling means adapted to couple the ring to the elongate cylindrical member. The connection of the ring to the cylindrical member defines an obtuse angle between a plane of the ring and a longitudinal axis of the cylindrical member. A generally annular member, for holding the disposal container to the support, has an open side defined by two ends that each extends outward away from the annular member. The annular member is adapted to fit over the first ring wherein each of the two ends is adapted to fit on each side of the coupling means. A pin is used for securing the annular member to the coupling means. The pin fits in a bore in each of the ends of the annular member and a bore of the coupling means. A disposal means, or bag, is used for catching and carrying feces.

In these respects, the implement for disposing of dung of a pet animal according to the present invention substantially departs from the conventional concepts and designs of the prior art, and in so doing provides an apparatus primarily developed for the purpose of catching feces before it falls to the ground.

SUMMARY OF THE INVENTION

In view of the foregoing disadvantages inherent in the known types of feces disposal devices now present in the prior art, the present invention provides a new implement for disposing of dung of a pet animal construction wherein the same can be utilized for catching feces before it falls to the ground.

The general purpose of the present invention, which will be described subsequently in greater detail, is to provide a new implement for disposing of dung of a pet animal apparatus and method which has many of the advantages of the feces disposal devices mentioned heretofore and many novel features that result in a new implement for disposing of dung of a pet animal which is not anticipated, rendered obvious, suggested, or even implied by any of the prior art feces disposal devices, either alone or in any combination thereof.

To attain this, the present invention generally comprises an elongate cylindrical member, a ring for supporting a disposal container wherein the ring has a coupling means adapted to couple the ring to the elongate cylindrical member. The connection of the ring to the cylindrical member defines an obtuse angle between a plane of the ring and a longitudinal axis of the cylindrical member. A generally annular member, for holding the disposal container to the support, has an open side defined by two ends that each extends outward away from the annular member. The annular member is adapted to fit over the first ring wherein each of the two ends is adapted to fit on each side of the coupling means. A pin is used for securing the annular member to the coupling means. The pin fits in a bore in each of the ends of the annular member and a bore of the coupling means. A disposal means, or bag, is used for catching and carrying feces.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new implement for disposing of dung of a pet animal apparatus and method which has many of the advantages of the feces disposal devices mentioned heretofore and many novel features that result in a new implement for disposing of dung of a pet animal which is not anticipated, rendered obvious, suggested, or even implied by any of the prior art feces disposal devices, either alone or in any combination thereof.

It is another object of the present invention to provide a new implement for disposing of dung of a pet animal which may be easily and efficiently manufactured and marketed.

It is a further object of the present invention to provide a new implement for disposing of dung of a pet animal which is of a durable and reliable construction.

An even further object of the present invention is to provide a new implement for disposing of dung of a pet animal which is susceptible of a low cost of manufacture with regard to both materials and labor, and which accordingly is then susceptible of low prices of sale to the consuming public, thereby making such implement for disposing of dung of a pet animal economically available to the buying public.

Still yet another object of the present invention is to provide a new implement for disposing of dung of a pet animal which provides in the apparatuses and methods of the prior art some of the advantages thereof, while simultaneously overcoming some of the disadvantages normally associated therewith.

Still another object of the present invention is to provide a new implement for disposing of dung of a pet animal for catching feces before it falls to the ground.

Yet another object of the present invention is to provide a new implement for disposing of dung of a pet animal which includes an elongate cylindrical member, a ring for supporting a disposal container wherein the ring has a coupling means adapted to couple the ring to the elongate cylindrical member. The connection of the ring to the cylindrical member defines an obtuse angle between a plane of the ring and a longitudinal axis of the cylindrical member. A generally annular member, for holding the disposal container to the support, has an open side defined by two ends that each extends outward away from the annular member. The annular member is adapted to fit over the first ring wherein each of the two ends is adapted to fit on each side of the coupling means. A pin is used for securing the annular member to the coupling means. The pin fits in a bore in each of the ends of the annular member and a bore of the coupling means. A disposal means, or bag, is used for catching and carrying feces.

Still yet another object of the present invention is to provide a new implement for disposing of dung of a pet animal that can be folded for easier transportation and unfolded to allow extension of the feces catch.

Even still another object of the present invention is to provide a new implement for disposing of dung of a pet animal that will allow the user to avoid bending over and prevent back strain especially in those groups such as the elderly who are more susceptible to back strain.

Yet still another object of the present invention is to provide a new implement for disposing of dung of a pet animal that promotes environmental health by efficiently removing animal feces.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
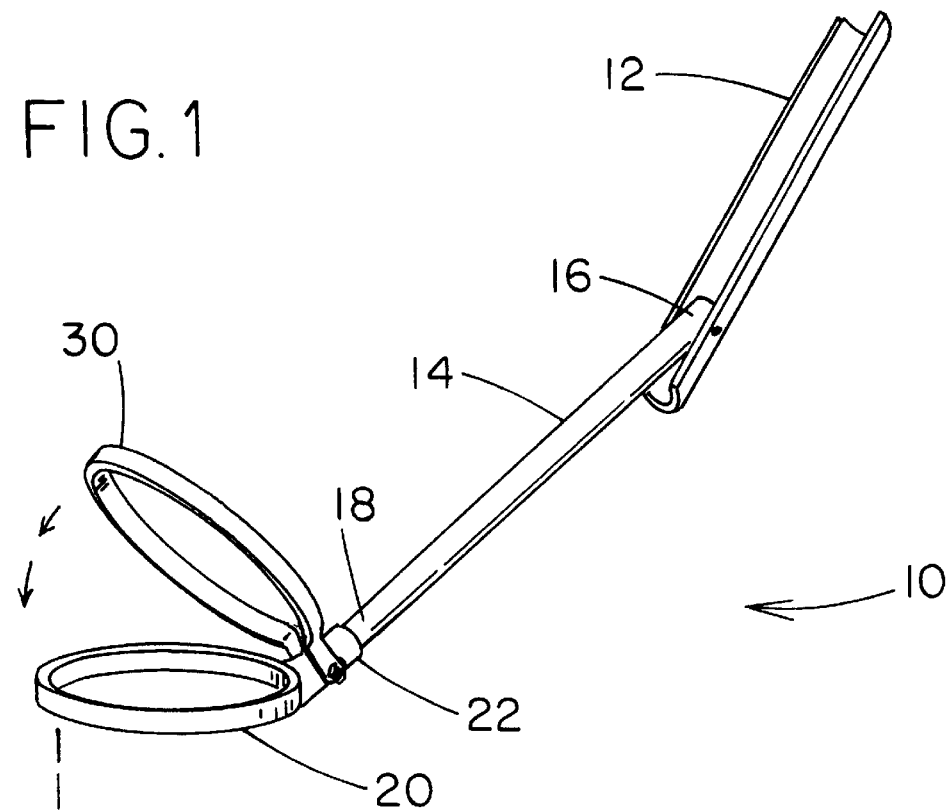
FIG. 1 is a schematic perspective view of a new implement for disposing of dung of a pet animal according to the present invention.
Figure 2:
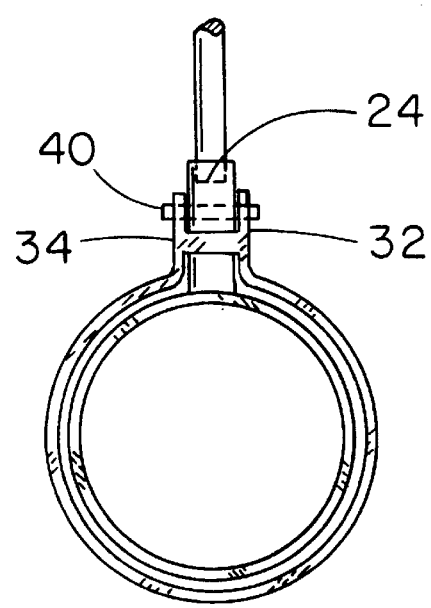
FIG. 2 is a schematic plan view of the present invention.

With reference now to the drawings, and in particular to FIGS. 1 and 2 thereof, a new implement for disposing of dung of a pet animal embodying the principles and concepts of the present invention and generally designated by the reference numeral 10 will be described.

As best illustrated in FIGS. 1 and 2, the implement for disposing of dung of a pet animal 10 generally comprises a channel member 12. The tube is hollow and has an open face such that a cross-section of the tube forms a semicircle.

An elongate cylindrical member 14 having a first end 16 and second end 18, has an outside surface whereby a radius of a cross section of the cylindrical member measured to the outside surface is substantially equal to a radius measured to an inner surface of the tube such that the cylindrical member rests in the tube.

The first end of the elongate cylindrical member is preferably coupled to an end of the channel member such that the second end of the elongate cylindrical member is adapted to swing between a stored position nested in the channel member and an operative position extending away from the channel member. This can be accomplished by any number of hinging means; however, a pin placed in a bore in the cylindrical member 14 and tube 12 will work well and will be easy to manufacture. Preferably, when the cylindrical member is extended fully, the cylindrical member and tube will form a substantially straight line enjoying a shared longitudinal axis.

A ring 20 is utilized for supporting a disposal means. The ring is made from a band and preferably the ring has a cross-sectional width approximately equal to a diameter of the cylindrical member. Preferably, the ring has a diameter greater than two inches.

A cylindrical rod 22 extends from the ring. The rod has a well 24 therein adapted for reception of the second end 18 of the cylindrical member. Preferably, the rod extends upwardly away from the ring. Ideally, the connection of the ring to the cylindrical member via the rod defines an angle between a plane of the ring and a longitudinal axis of the cylindrical member measuring approximately 120 degrees to 150 degrees.

A generally annular member 30 is used for holding the disposal means to the support ring. The annular member has a break defined by two ends 32, 34. Each of the ends extends radially outward away from the annular member. The annular member is adapted to fit over the first ring wherein each of the two ends is pivotally mounted on opposite sides of the rod 22.

A pin 40 for pivotally mounting the annular member to the rod fits in a bore in each of the ends of the annular member. The pin also fits through a bore of the rod, thereby securing the annular member to the ring.

A disposal container, preferably a bag 50, is used for carrying or collecting feces. The bad has an opening with a marginal portion on the perimeter of the opening. The marginal portion is drapable over the ring when the bag is inserted through the hole in the ring. The bag is placed in the ring 20 and the annular member 30 is lowered over the ring such that the bag is cinched between the ring and the annular member and is restricted from falling through the ring.

In use, the user extends the device by allowing the cylindrical member 14 to extend away from the tube 12 via the hinge. A bag 50 is placed in the ring 20 and the annular member 30 is lowered over it to catch the bag between the annular member and the ring, thus holding the bag in place. Ideally, the connection between the ring and the cylindrical member is angled slightly so that the user may place the bag under the animal to catch the feces before it falls to the earth. The bag is then removed, thrown away and replaced with a new bag.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An animal feces disposal device, comprising:

an elongate cylindrical member;

a ring for supporting a disposal container, said ring having a coupling means adapted to couple said ring to said cylindrical member;

wherein a connection of said ring to said cylindrical member defines an angle between a plane of said ring and a longitudinal axis of said cylindrical member, said angle being generally between 120 and 150 degrees;

a generally annular member for holding said disposal container on said ring, said annular member being pivotally mounted to said ring, said annular member having a break therein between two ends of said annular member, each of said ends extending radially outward away from said annular member, said annular member being adapted to fit over said ring such that said ring nests in said annular member, each of said two ends being pivotally mounted on opposite sides of said coupling means;

a pin for pivotally mounting said annular member to said coupling means, said pin fitting in a bore in each of said ends of said annular member, said pin fitting through a bore in said coupling means; and a disposal container for carrying feces.

2. The animal feces disposal device of claim 1, further comprising:

a channel member, said channel member is hollow and has an open face such that a cross-section of said tube forms a semicircle;

wherein said cylindrical member has a first end and second end, said cylindrical member having an outside surface, wherein a radius of a cross section of said cylindrical member measured to said outside surface is substantially equal to a radius measured to an inner surface of said channel member such that said cylindrical member may be rested in the open face of said channel member; and wherein said first end of said elongate cylindrical member is hingedly coupled to an end of said channel member such that said second end of said elongate cylindrical member is adapted to swing between a stored position nested in said channel member and an operative position extending away from said channel member.

3. The animal feces disposal device of claim 1, wherein said ring has a cross-section width approximately equal to a diameter of said cylindrical member.

4. The animal feces disposal device of claim 1, wherein said coupling means comprises a rod extending from an outer surface of said ring, said rod having a well therein adapted for reception of a second end of said cylindrical member, said rod extending upwardly away from said ring.

5. The animal feces disposal device of claim 1, wherein said disposal container comprises a bag, said bag having an opening with a marginal portion about said opening, said marginal portion being drapable over said ring when said bag is inserted through a hole in said ring.

6. An animal feces disposal device, comprising:

a channel member, said channel member is hollow and has an open face such that a cross-section of said channel member forms a semicircle;

an elongate cylindrical member, said cylindrical member having a first end and second end, said cylindrical member having an outside surface, wherein a radius of a cross section of said cylindrical member measured to said outside surface is substantially equal to a radius measured to an inner surface of said channel member such that said cylindrical member may be rested in the open face of said channel member;

wherein said first end of said elongate cylindrical member is hingedly coupled to an end of said channel member such that said second end of said elongate cylindrical member is adapted to swing between a stored position nested in said channel member and an operative position extending away from said channel member;

a ring for supporting a disposal container, said ring being formed by a band, said band having a cross-section width approximately equal to a diameter of said cylindrical member, said ring having a diameter greater than two inches;

said ring including a cylindrical rod extending from an outer surface of said ring, said rod having a well therein adapted for reception of said second end of said cylindrical member, said rod extending upwardly away from said ring;

wherein a connection of said ring to said cylindrical member via said rod defines an angle between a plane of said ring and a longitudinal axis of said cylindrical member, said angle being generally between 120 and 150 degrees;

a generally annular member for holding said disposal container on said ring, said annular member being pivotally mounted to said ring, said annular member having a break therein between two ends of said annular member, each of said ends extending radially outward away from said annular member, said annular member being adapted to fit over said ring such that said ring nests in said annular member, each of said two ends being pivotally mounted on opposite sides of said rod;

a pin for pivotally mounting said annular member to said rod, said pin fitting in a bore in each of said ends of said annular member, said pin fitting through a bore in said rod;

a disposal container for carrying feces, said disposal container comprising a bag, said bag having an opening with a marginal portion about said opening, said marginal portion being drapable over said ring when said bag is inserted through a hole in said ring; wherein said bag is adapted to be placed in said ring, said annular member being adapted to be lowered over said ring such that a marginal part of said bag is cinched between said ring and said annular member, and said bag is restricted from falling through said ring.

7. An animal feces disposal device, comprising: an elongate member;

a ring for supporting a disposal container, said ring having a coupling means adapted to couple said ring to said elongate member;

wherein a connection of said ring to said elongate member defines an angle between a plane of said ring and a longitudinal axis of said elongate member, said angle being generally between 120 and 150 degrees;

a generally annular member for holding said disposal container on said ring, said annular member being pivotally mounted to said ring, said annular member having a break therein between two ends of said annular member, each of said ends extending radially outward away from said annular member, said annular member being adapted to fit over said ring such that said ring nests in said annular member, each of said two ends being pivotally mounted on opposite sides of said coupling means; and a disposal container for carrying feces.

8. The animal feces disposal device of claim 7, further comprising a pin for pivotally mounting said annular member to said coupling means, said pin fitting in a bore in each of said ends of said annular member, said pin fitting through a bore in said coupling means.

* * * * *